United States Patent [19]

Berkin

[11] Patent Number: 4,853,968
[45] Date of Patent: Aug. 1, 1989

[54] PATTERN RECOGNITION APPARATUS AND METHOD

[75] Inventor: George M. Berkin, Yardley, Pa.

[73] Assignee: Kulicke & Soffa Industries, Inc., Willow Grove, Pa.

[21] Appl. No.: 99,398

[22] Filed: Sep. 21, 1987

[51] Int. Cl.$^4$ .............................................. G06K 9/00
[52] U.S. Cl. ........................................ 382/8; 358/107; 382/14; 382/18; 382/48
[58] Field of Search .................. 382/8, 45, 42, 48, 14, 382/15, 18, 30, 33, 34; 358/101, 106, 107, 137, 140; 364/559; 340/731

[56] References Cited

U.S. PATENT DOCUMENTS

| | | | |
|---|---|---|---|
| 4,164,728 | 8/1979 | Marsh | 382/18 |
| 4,200,861 | 4/1980 | Hubach et al. | 382/34 |
| 4,441,205 | 4/1984 | Berkin et al. | 382/18 |
| 4,528,693 | 7/1985 | Pearson et al. | 382/56 |
| 4,607,282 | 8/1986 | van de Polder | 358/140 |
| 4,677,482 | 6/1987 | Lewis, Jr. | 358/140 |
| 4,709,393 | 11/1987 | Taylor et al. | 382/41 |
| 4,736,437 | 4/1988 | Sacks et al. | 382/44 |

Primary Examiner—Leo H. Boudreau
Assistant Examiner—Joseph Mancuso
Attorney, Agent, or Firm—Woodcock Washburn Kurtz Mackiewicz & Norris

[57] ABSTRACT

A method of operating a pattern recognition apparatus comprises generating a plurality of sub pixel sub signatures from a reference signature, wherein the sub pixel sub signatures correspond to fractional pixel (sub pixel) positions. A target sub signature is compared to each of the sub pixel sub signatures to determine the relative placement of a target object to within a fraction of a pixel.

36 Claims, 8 Drawing Sheets

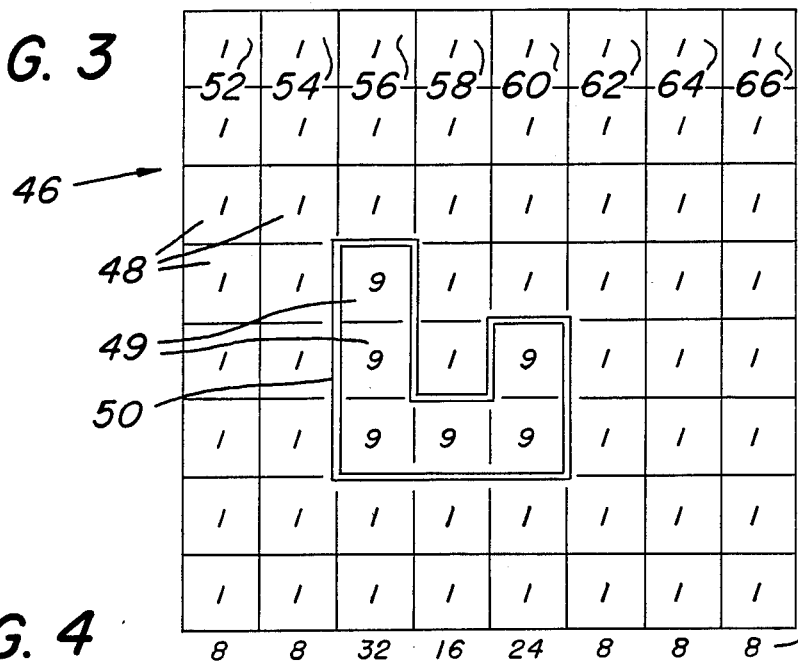
FIG. 3
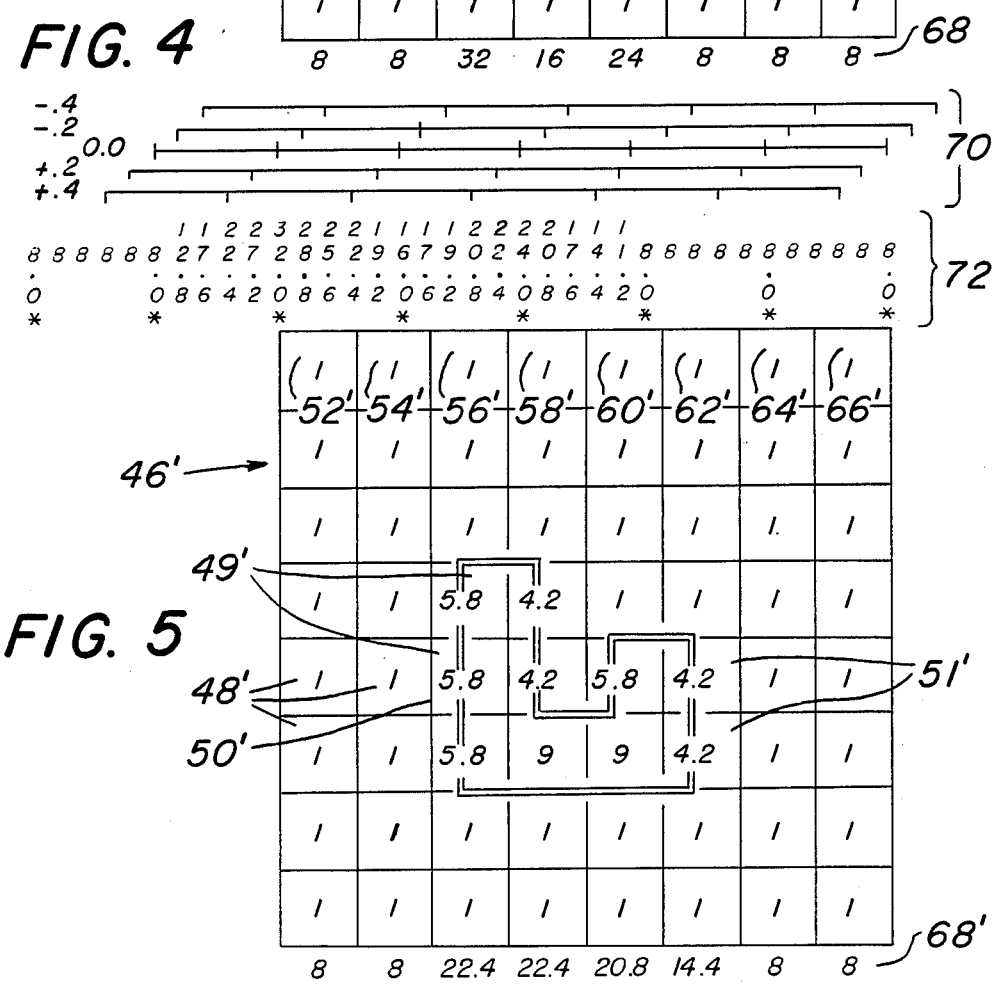
FIG. 4
FIG. 5

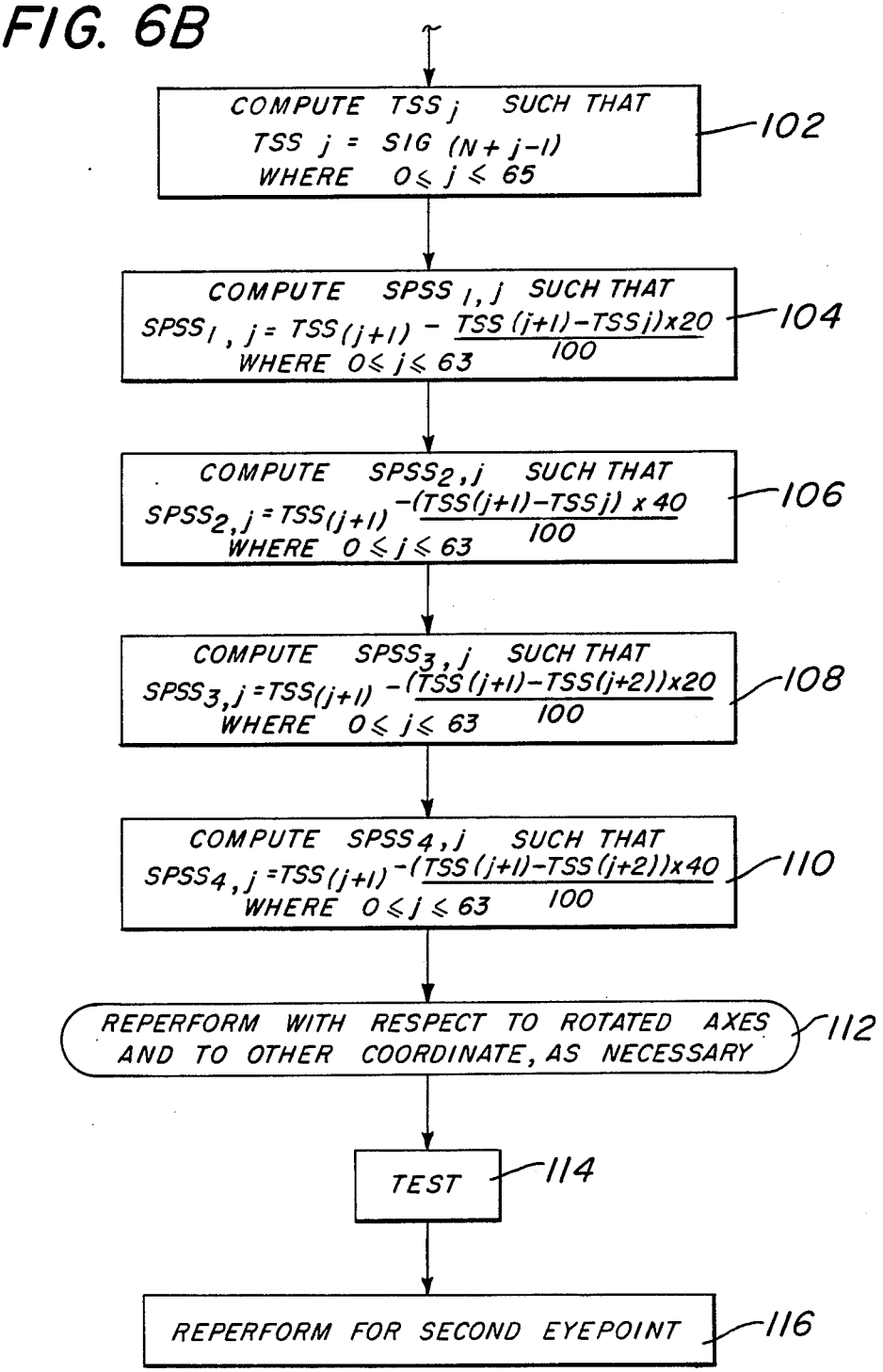

PATTERN RECOGNITION APPARATUS AND METHOD

INCORPORATION BY REFERENCE

Commonly assigned U.S. Pat. No. 4,441,205 entitled "Pattern Recognition System" issued Apr. 3, 1984 (hereinafter "the '205 patent") is incorporated herein by reference.

BACKGROUND OF THE INVENTION

The present invention is directed generally to pattern recognition apparatus, also known as and referred to herein as vision systems. More particularly, the present invention is directed to an improvement, by modification, to the pattern recognition apparatus and method of the '205 patent.

The '205 patent is directed to a pattern recognition apparatus and method for measuring displacement (or position) of a target object relative to a reference object using digital techniques. The method and apparatus of the '205 patent employs "signatures" obtained from digital image data of the reference and target objects to compute relative position. Comparison techniques wherein different portions of the reference and target signatures, called "sub signatures", are successively compared are employed to determine the amount of shift, if any, between the reference and target objects and hence provide an indication of the relative position of the target object.

The digital image from which the signatures are generated is a matrix of picture elements called "pixels". Each integer pixel reports a single magnitude representing the intensity of light reflected from a portion of an object viewed by a camera. Thus, an integer pixel cannot report partially one intensity and partially another. Each integer pixel in the matrix contributes to the overall image of the object, but its only contribution is a signal having a magnitude representing a single intensity level.

The aforementioned pixel characteristic gives rise to a problem with the method and apparatus of the '205 patent. That is, the relative position of the target object can be reported only in an integer number of pixels, even if the target object is shifted only a fraction of a pixel ("sub pixel"), or a fractional number of pixels, relative to the reference object. As a consequence, the position data provided by the apparatus of the '205 patent often contains an error; that error is the fraction of a pixel that is missing in the position data.

There is yet another problem with the method and apparatus of the '205 patent caused by the pixel characteristic. Consider FIG. 2, graph 42, which is a graph of the degree of match between the signature of a reference object and the signature of a target object, as the target object is moved through fractional pixel steps. Note that graph 42 is a large amplitude sawtooth having sharp rising and falling edges. The large changes in amplitude in graph 42 occur because integer pixel distances are being compared. Thus, when the target object is displaced exactly 1, 2, 3, or any integer number of pixels, relative to the reference object, the degree of match is good, as indicated by the minima of graph 42 (e.g., minima 43). However, when the target object is displaced a fractional number of pixels relative to the reference object, e.g., ½ pixel, 1½ pixels, etc., the degree of match is poor, as indicated by the maxima of graph 42 (e.g., maxima 45). Since, in the method and apparatus of the '205 patent, the degree of match between the two signatures is the key parameter in the decision whether to accept or reject the current "eyepoint" (i.e., scene of the object viewed by the camera), the graph of the degree of match between the two signatures should ideally approximate a horizontal line and not have large changes in amplitude between integer pixel positions. This ideal could be approximated if it were possible to provide more accurate position data, i.e., to within a fraction of a pixel.

It is therefore desirable to provide an improved pattern recognition method and apparatus that reports relative position data in fractional pixels, i.e., reports "sub pixel" positions. It is further desirable that any modifications necessary to the method and apparatus of the '205 patent to achieve the foregoing objective be inexpensive and easy to implement. The present invention meets these objectives.

SUMMARY OF THE INVENTION

According to the preferred embodiment, the present invention has application to a vision system of the type employing a camera for providing an image comprising a plurality of adjacent pixels arranged in a matrix, each integer pixel being represented by an output signal having a magnitude indicative of a surface condition of a corresponding portion of an object viewed by the camera. The system preferably includes means for digitizing the output signals and providing a digital image of at least a portion of the object. According to the invention, a method of operating the system comprises operation in a teach mode and in a run mode. In the teach mode, the following steps are performed:

viewing a reference object with the camera;

generating a reference signature (also referred to herein as a teach signature) from the digital image of the reference object wherein the reference signature comprises a series of sums (also referred to herein as signature "elements"), each sum being obtained by totaling digital image data corresponding to columns or rows of integer pixels;

selecting a portion of the reference signature that corresponds to a unique portion of the image of the reference object (i.e., selecting a portion of the reference signature that is most unlike any other portion of the reference signature) and defining the selected portion as a reference sub signature (also referred to herein as a teach sub signature); and, generating a plurality of sub pixel sub signatures from the reference sub signature wherein each sub pixel sub signature corresponds to a unique sub pixel position and is obtained by linearly ramping the reference sub signature.

In the run mode, the following steps are performed:

viewing a target object with the camera;

generating a target signature from the digital image of the target object wherein the target image comprises a series of sums, each sum being obtained by totaling digital image data corresponding to columns or rows of integer pixels;

comparing the target signature with the reference signature in a selected range of integer pixel positions to locate the particular integer pixel position providing the best match (the result of this comparison yields the integer portion of measured relative placement), the result defining a target sub signature;

comparing the target sub signature to the sub pixel sub signatures to determine the sub pixel sub signature that most closely matches the target sub signature (the result of this comparison yields the fractional portion of measured relative displacement); and providing an indication of position of the target object relative to the reference object based upon the result of the determination of the preceding two steps.

Preferably, a work table upon which the target object is placed is automatically moved relative to a work station by an amount depending upon the provided indication of position of the target object.

In a preferred practice of the invention, four sub pixel sub signatures are generated and correspond to +20%, +40%, −20% and −40% displacement relative to integer pixel boundaries. In this preferred practice of the invention, the position of the target object relative to the reference object can be determined to within 1/5 of a pixel.

The step of linearly ramping the reference sub signature to obtain the plurality of sub pixel sub signatures that is performed in the teach mode preferably comprises application of a formula of the following type to the sums comprising the reference sub signature:

$$[V_{(N+1)} - V_N] \times F_+ V_N$$

where:

N = the number of the column or row in the matrix;
V = the value of the sum in the reference sub signature corresponding to the column or row number specified; and,
F = the result of 1 minus the decimal value of the sub pixel position for which it is desired to generate a sub pixel sub signature.

Apparatus according to the present invention employs camera means for providing an image comprising a plurality of adjacent pixels arranged in a matrix, each integer pixel being represented by an output signal having a magnitude indicative of a surface condition of a corresponding portion of an object viewed by the camera means. The apparatus further comprises processing means operatively coupled to the camera means for receiving the output signals from the pixels.

The processing means is operable in a teach mode, when a reference object has been viewed by the camera means, to perform the following steps:

sum the magnitudes corresponding to columns or rows of integer pixels in a predetermined manner to provide a series of sums defining a teach (reference) signature;

select a portion of the teach signature that is most unlike any other portion of the teach signature, the selected portion defining a teach sub signature; and, linearly ramp the teach sub signature to provide a plurality of sub pixel sub signatures, each sub pixel sub signature corresponding to a sub pixel position.

The processing means is further operable in a run mode, when a target object has been viewed by the camera means, to perform the following steps:

sum the magnitudes corresponding to columns or rows of integer pixels in a predetermined manner to provide a series of sums defining a target signature;

compare the target signature with the teach signature in a selected range of integer pixel positions to locate the particular integer pixel position providing the best match (the result of this comparison yields the integer portion of measured relative displacement), the result defining a target sub signature;

compare the target sub signature to the sub pixel sub signatures to determine the sub pixel sub signature that most closely matches the target sub signature (the result of this comparison yields the fractional portion of measured relative displacement); and provide an indication of the result of the determination.

The step of linearly ramping the teach sub signature that is performed in the teach mode is preferably performed by application of a formula of the type set forth above to the teach sub signature.

Though described herein for use in a vision system, the present invention is not limited thereto. Thus, the present invention is broadly directed to a method of "sub pixeling". In its most general form, the method of sub pixeling of the present invention comprises the steps of:

providing a signature comprising a series of sums, the signature being representative of position of an object relative to a plurality of integer pixels; and, linearly ramping at least a portion of the signature to provide at least one sub pixel sub signature, the sub pixel sub signature corresponding to a sub pixel position. The step of linearly ramping at least a portion of the signature is preferably performed by application of a formula of the type set forth above to the signature.

BRIEF DESCRIPTION OF THE DRAWINGS

FIG. 3 conceptually illustrates a matrix of pixels with an image of an object being located at a precise integer pixel position.

FIG. 4 graphically illustrates the effect on the value reported by a pixel as an object is shifted.

FIG. 5 conceptually illustrates a matrix of pixels with an image of an object being located at a fractional pixel (sub pixel) position.

FIGS. 6A and 6B are flow charts illustrating the preferred practice of the method of the present invention in the teach mode.

DESCRIPTION OF THE PREFERRED EMBODIMENT

Figure 1:
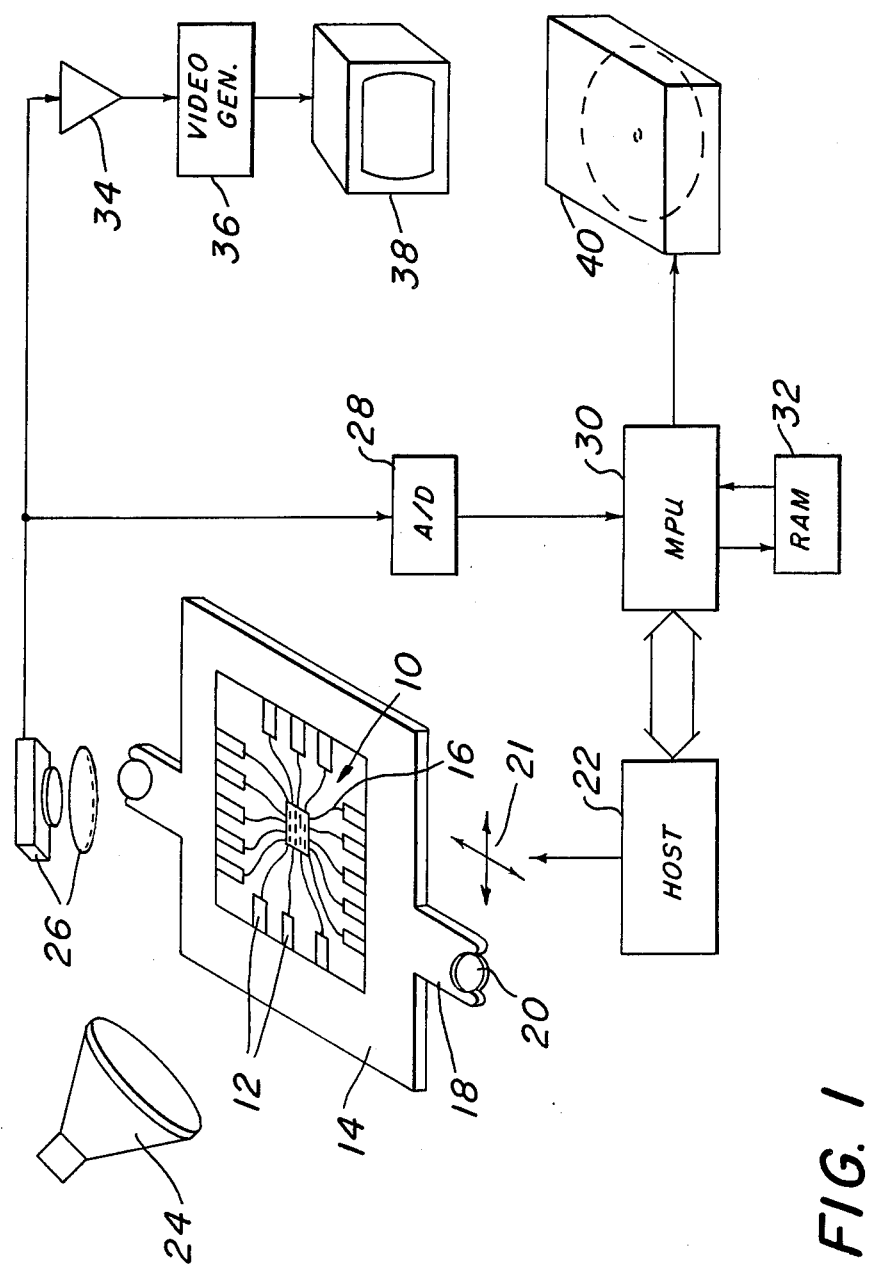
FIG. 1 is a block diagram of a hardware system suitable for use in connection with the practice of the present invention.

Referring now to the drawings, wherein like numerals represent like elements, there is illustrated in FIG. 1 a block diagram of a pattern recognition system, or vision system, for use with a wire bonder for bonding wire leads 16 to an integrated circuit die 10. (Although the invention is described herein for use with wire bonding apparatus, it should be understood that the invention is not limited thereto and has application wherever it is desired to accurately locate the relative position of an object.) Die 10 provided with bonding pads 12 is affixed to an integrated circuit device indicated generally at 14. Device 14 is fitted with a plurality of lead connections 16, which are large enough so that they may be attached to conventional integrated circuit terminals, such as in line pins, and the like. The device 14 is shown as being provided with means 18 for mating with index pins 20 disposed on the work table (not shown) of a wire bonding machine as is well known in the art. The work table is movable in orthogonal directions, as indicated by the arrows 21, under control of a host controller 22. The operation of host controller 22 is described herein and in more detail in the '205 patent.

According to the invention, the relative position of the die 10, and hence the bonding pads 12, are precisely determined relative to a reference object. As explained in the '205 patent, this position information is utilized to move the work table relative to a work station (not shown) for bonding leads 16 to bonding pads 12. Vision system apparatus for determining and providing the position information comprises a light source 24 illuminating the die 10 and optical and camera means 26 for receiving light reflected from die 10. Camera means 26 preferably comprises a camera of well known type such as a vidicon or CCD array for providing an image comprising a plurality of adjacent pixels arranged in a matrix. As is known, each integer pixel is represented by an analog output signal whose magnitude represents the amount of light reflected from a corresponding portion of the die 10. Thus the magnitude of an output signal is indicative of a surface condition of a corresponding portion of the die 10. The analog output signals are digitized by A/D converter 28; the digitized data is supplied to microprocessor 30 for processing as described herein. The digitized data is stored in RAM 32. Microprocessor 30 communicates with host 22 for moving the work table and performing wire bonding operations as more fully described in the '205 patent.

In a preferred embodiment of the present invention, a four bit word providing 16 levels of light intensity is used to represent each pixel; the pixels are 0.00025" square, that is, there are four pixels per mil.

The analog output signals from camera means 26 are also supplied to a buffer amplifier 34 which drives a video generator 36. Video generator 36 in turn drives monitor 41. Monitor 41 is utilized to provide a visual image for viewing by the operator to assist the operator in locating an "eyepoint" of the die 10 during a teach operation, as also more fully described in the '205 patent. Microprocessor 30 may feed on line storage means such as a floppy disk 40 for storage of position information generated according to the method of the present invention.

The present invention utilizes signatures and sub signatures that are generated in accordance with the teachings of the '205 patent. As explained in the '205 patent, the signature of an image, such as die 10, is an ordered series of intensity sums. Each sum (element) in the series is the arithmetic sum of digital intensity values of a column (or row) of integer pixels. (For simplicity, the term "column" is hereafter used to include both vertical columns and horizontal rows; thus, where the term "column" is used herein and in the appended claims, it should not be construed as limited to vertical columns, but rather should be construed to include horizontal rows as well.) Consider FIG. 3. FIG. 3 conceptually illustrates a digitized image 46 of an object (represented by the "9's) and background (represented by the "1's"). As shown, the image comprises a plurality of adjacent integer pixels 48 arranged in a matrix having columns 52-66. Each integer pixel reports a digital intensity value having a magnitude that is dependent upon a corresponding portion of the object viewed by the camera means 26. In the example of FIG. 3, the numbers represent the magnitude (brightness) of reflected intensity from corresponding portions of the area viewed by the camera; a "1" represents a dark feature and a "16" would represent the brightest feature. The image 50 of the object is shown as being moderately bright with an intensity level of "9". Thus, in FIG. 3, the majority of the integer pixels 48 report a "1", representing a black background or lack of an object. However, several of the integer pixels 48 in columns 56, 58 and 60 report a "9" representing the image 50 an object. The signature 68 obtained from the entire image 46 is, as explained in the '205 patent, obtained by summing the digital pixel values in each of columns 52-66. Such signatures, when suitably generated from an appropriate portion of an object selected by the operator (called an "eyepoint"), are known from the '205 patent to accurately represent the relative position of the object represented by image 50 to within one integer pixel.

As best seen from signature 68, the individual sums of a signature are in general different from each other. Specifically, adjacent sums are different in conformance to the abruptness of the change in the integrated intensities of adjacent columns of integer pixels. Compare, for example, the third sum, 32, of signature 68 to the fourth sum, 16.

One may consider each of the columns 52-66 as coarse columns of integer pixels that each represent the average intensity of a plurality of imaginary fine columns. For example, consider column 56 as a coarse column comprising a plurality, preferably five, fine columns. Further consider each integer pixel in the coarse column 56 as having a portion of the image 50 falling in each one of the five fine columns. The value reported by each integer pixel in the coarse column can be thought of as being the average intensity of the portions falling in each of the five fine columns. Thus, since the image 50 has edges falling on precise integer pixel boundaries, the average intensity that would be reported by that portion of the integer pixels 49 in each of the five imaginary fine columns would be 9/5=1.8.

Thus, it will be appreciated that if a line between two coarse columns happens to coincide with a sharp vertical feature edge, as illustrated in FIG. 3, then one coarse sum would be greatly different from its neighbor, as is the case with signature 68. However, if that line were not exactly between the coarse columns, the difference in the coarse sums would not be as great. This is so because fewer of the one group of fine columns would show the change, and hence the average would be closer to that of the neighbor. This is illustrated in FIG. 5.

FIG. 5 conceptually illustrates a digitized image 46' of an object (again represented by the "9's") and background (again represented by the "1's"). The image comprises a plurality of adjacent integer pixels 48' arranged in columns 52'-66'. The image 50' of the object is shifted to the right by 0.4 pixel relative to the image 50 of FIG. 3. Note, that in FIG. 5 an integer pixel that previously reported a 9 (in FIG. 3) now reports a 5.8 because only 0.6 of the image is in coarse column 56', and thus only 0.6 of the integer pixel reports a 9. Similarly, 0.4 of that integer pixel reports a 1. Thus, the value that will be reported by the integer pixels 49' in columns 56' can be determined mathematically as follows:

|   |   |   |
|---|---|---|
| 0.6 × 9 | = | 5.4 |
| 0.4 × 1 | = | 0.4 |
| TOTAL | = | 5.8 |

Thus, the integer pixels 49' in column 56' will each report a 5.8.

Similarly, referring to coarse column 62', an integer pixel that previously reported a 1 in FIG. 3, now reports a 4.2 because 0.4 of each integer pixel 51' in column 62' now reports a 9 and 0.6 of each integer pixel now reports a 1. Thus, the value that will be reported by each integer pixel 51' can be determined mathematically as follows:

|   |   |   |
|---|---|---|
| 0.4 × 9 | = | 3.6 |
| 0.6 × 1 | = | 0.6 |
| TOTAL: | = | 4.2 |

Note the resulting signature 68'. The value of several of the sums has changed, thus indicating that the image 50' is shifted relative to image 50 of FIG. 3. Note further, however, that the total sum of signatures 68 and 68' are the same:

| |
|---|
| 8 + 8 + 32 + 16 + 24 + 8 + 8 + 8 = 112 |
| (signature 68) |
| 8 + 8 + 22.4 + 22.4 + 20.8 + 14.4 + 8 + 8 = 112 |
| (signature 68') |

As mentioned, in the preferred practice of the invention, five imaginary fine columns are established for each of the coarse columns. Preferably, these correspond to fractional pixel (sub pixel) positions of 0.0 (the integer pixel boundary), 0.2., 0.4, 0.6 and 0.8.

FIG. 4 graphically illustrates by way of example the effect on the value reported by an integer pixel as the image 50 is shifted.

Thus, the new signatures that will result from an image shift can be predicted by separately operating on each integer pixel, as above. The ability to predict the new signatures is useful, since it permits one to accurately determine the position of an object to within a fraction of a pixel as discussed below. However, the above "integration" method of separately operating on each integer pixel is cumbersome and time consuming. It has been found, however, that one can accurately predict the actual resulting signatures occurring from image shift, by "linearly ramping" the signature. Thus, using the "linearly ramping" technique described herein, it is unnecessary to shift the image through sub pixel steps and generate a signature for each by the integration method discussed above.

According to the invention, signatures corresponding to sub pixel positions (called "sub pixel signatures" or "sub pixel sub signatures") are calculated by applying a formula of the following type to a known signature:

$$[V_{(N+1)} - V_N] \times F + V_N$$

where:

N = the number of the column or row in the matrix;
V = the value of the sum in the signature corresponding to the column or row number specified; and,
F = the result of 1 minus the decimal value of the sub pixel position for which it is desired to generate a sub pixel sub signature.

Thus, consider signature 68 which corresponds to no sub pixel shift, i.e., the image has edges falling on an integer pixel boundary. The sub pixel sub signature for the 0.4 sub pixel position is calculated, according to the present invention, as follows:

| Linear ramping for 0.4 sub pixel position $(F = 1 - 0.4 = 0.6)$ | | |
|---|---|---|
| Column in Matrix (FIG. 3) | $[V_{(N+1)} - V_N] \times F + V_N$ | Result (sub pixel signature) |
| 52 | 8 − 8 × 0.6 + 8 | 8 |
| 54 | 32 − 8 × 0.6 + 8 | 22.4 |
| 56 | 16 − 32 × 0.6 + 32 | 22.4 |
| 58 | 24 − 16 × 0.6 + 16 | 20.8 |
| 60 | 8 − 24 × 0.6 + 24 | 14.4 |
| 62 | 8 − 8 × 0.6 + 8 | 8 |
| 64 | 8 − 8 × 0.6 + 8 | 8 |
| 66 | 8 − 8 × 0.6 + 8 | 8 |
| | TOTAL: | 112 |

Note that the sub pixel sub signature generated for the 0.4 sub pixel position by linear ramping above is exactly the same as that obtained by the integration method. Compare the sub pixel sub signature above to signature 68'. This method of "sub pixeling" by linearly ramping a signature, can be used to determine the relative position of an object. FIGS. 6A–6B and 7A–7C illustrate the flow chart of a method that employs this sub pixeling technique to determine relative object position to within a fractional of a pixel.

The method illustrated in FIGS. 6 and 7 is a modification to the method disclosed in the '205 patent. Hence, where required, reference should be made to the '205 patent for additional detail. Preferably, well known computer coding techniques are employed to program microcomputer 30 to perform the method illustrated in FIGS. 6 and 7.

Teach Mode

Figure 6A:
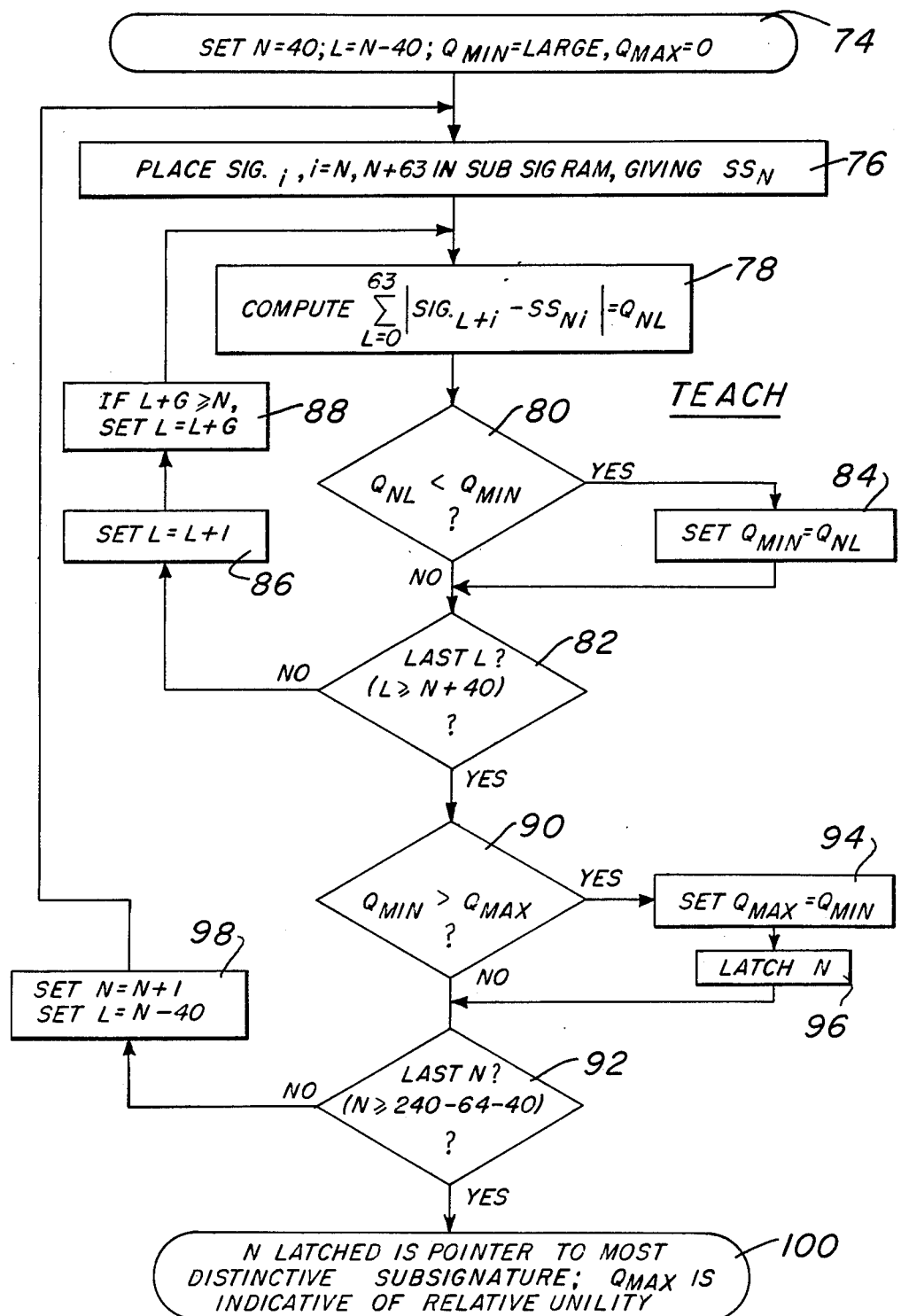

As more fully explained in the '205 patent, a vision system is preferably first operated in a "teach mode" wherein a reference object is viewed for the purpose of obtaining a teach or reference signature and sub signature. This teach mode of operation, modified according to the present invention, is illustrated in FIGS. 6A and 6B. In the teach mode of operation, a reference object is placed under the camera means for the purpose of generating the reference signature and reference sub signature, as more fully explained in the '205 patent. In this mode of operation, microprocessor 30 preferably performs the steps illustrated in blocks 74 through 116 of FIGS. 6A and 6B. Thus, operation begins at block 74 wherein values are assigned to two variables N and L. As explained in the '205 patent, N and L are pointers that are used to select that portion of the signature that is most unlike any other portion of the signature and hence corresponds to a unique portion of the image. The selected portion is known as a "sub signature." Values are also assigned to variables $Q_{MIN}$ and $Q_{MAX}$, as shown. As explained in the '205 patent, Q, $Q_{MIN}$, and $Q_{MAX}$ are variables that are also used to select the sub signature. It should be understood that the values assigned to N and L may vary depending upon the size of the pixel array; the values assigned at block 74 are preferred for use in operating upon an array of 160 by 160 pixels.

After values have been assigned to the variables at step 74, step 76 is performed. First, a reference signature previously generated for the reference object is retrieved from memory and operated upon, as shown. A first sub signature to be tried ($SIG_i$), comprising element $i=N$ of the reference signature and running through element $i=N+64$ of the reference signature, is brought into a sub signature RAM. The ith element of the Nth sub signature is referred to as $SS_{Ni}$. The step illustrated at block 78 is next performed. At block 78, the sum of 64 absolute values of the difference between $SIG_{L+i}$ (which is the ith element of the currently selected signature portion beginning at the location pointed to by L) and $SS_{Ni}$ (which is the $(N+i)$th sub signature element) is then computed. The result is referred to as $Q_{NL}$. At step 80, the value of $Q_{NL}$ is compared to the stored value of $Q_{MIN}$. If $Q_{NL}$ is less than $Q_{MIN}$, then the currently selected sub signature $SS_N$ fits the Lth portion of the signature better than it fits any previous portion, and $Q_{MIN}$ is set equal to $Q_{NL}$, as illustrated at step 84. If $Q_{NL}$ is greater than or equal to $Q_{MIN}$, then step 82 is performed where the current value of L is compared to the current value of $N+40$. The purpose of performing step 82 is to determine whether the current sub signature $SS_N$ under consideration has been compared to all portions of the signature from which it was derived to ensure that the most unique sub signature will be found. If the current value of L is less than the current value of $N+40$, the value of L is incremented by 1 as shown at step 86 and step 88 is then performed. At step 88, a check is made to determine whether the value of L is in the vicinity of N (and more particularly, whether it is within G units of N, where G is a constant defining a guard band). If L is determined to be within the vicinity of N, this is an indication that the sub signature $SS_N$ currently under consideration is being compared to that portion of the signature $SIG_i=N$ through $SIG_i=N+64$ from which it was derived. As illustrated at step 88, that area is skipped over so that false indications of $Q_{MIN}$ are not generated. As should be apparent, $Q_{MIN}$ is an error indicator that is used to select the sub signature $SS_N$ that is most unlike any other portion of the signature from which it was derived.

If it was determined at step 82 that the last L has been reached, that is, that the Nth sub signature $SS_N$ has been compared with all possible sub sets of the total signature $SIG_i=N$ through $SIG_i=N+64$, then the value of $Q_{MIN}$ is compared to see if it is greater than the value of $Q_{MAX}$, as illustrated at step 90. That is, at step 90, a test is performed to determine whether the current sub signature $SS_N$ is the most unique thus far tested. If so, the value of $Q_{MAX}$ is updated to that of $Q_{MIN}$ as illustrated at step 94 and N, the pointer locating where the most unique sub signature $SS_N$ is located within the signature SIG, is stored, as indicated at step 96. Step 92 is then performed where it is determined whether all possible sub signatures have been tested against the signature. If all possible sub signatures have not been tested, step 98 is performed where the value of N is incremented by 1 and the value of L is altered accordingly, as shown. Steps 76–96 are then repeated, as necessary.

If, at step 92, it was determined that the last possible sub signature $SS_N$ has been tested, then step 100 is performed. At step 100, the current value of N is latched and stored as the sub signature pointer, i.e., N points to that 64 element portion of the signature SIG that is most unlike an other portion of the signature. The value of $Q_{MAX}$, the error function, may also be stored as an indication of the usefulness of this sub signature. That is, the greater the value of $Q_{MAX}$, the more useful the selected sub signature.

Steps 102–116 of FIG. 6B are next performed. At step 102, a "teach" (or "reference") sub signature, $TSS_j$ is retrieved. The teach sub signature is the 64 element sub signature to which the pointer N points. Thus, the teach sub signature begins at that portion of the signature (SIG) designated by the latched value of the pointer N and extends $j-1$ elements thereafter, wherein j may assume the values shown in block 102. Thereafter, four sub pixel sub signatures are generated as indicated at steps 104, 106, 108 and 110. In the practice of the present invention, it has been found desirable to utilize sub pixel sub signatures corresponding to $-20\%$, $-40\%$, $+20\%$ and $+40\%$ fractional pixel (sub pixel) positions. By convention, a minus percentage represents a shift left by a fractional amount relative to an integer pixel boundary whereas a plus percentage represents a shift right relative to an integer pixel boundary. The $-20\%$ sub pixel sub signature for the image of the reference object is computed at step 104. The $-40\%$ sub pixel sub signature for the image of the reference object is generated at step 106. The $+20\%$ sub pixel sub signature for the image of the reference object is generated at step 108. And the $+40\%$ sub pixel sub signature is generated at step 110. The formulas utilized in steps 104–110 are of the same type as previously discussed and are applied to the teach sub signature as previously discussed. Note, however, that equation for the $+20\%$ and $+40\%$ position utilizes the value of $T_{ss}(j+2)$ in the subtrahend whereas the equation for the $-20\%$ and $-40\%$ positions utilizes the value of $T_{ss(j)}$. Thus, each element in the teach sub signature is linearly ramped to obtain a sub pixel sub signature that corresponds to the desired fractional (sub pixel) position, i.e., $-20$, $-40\%$, $+20\%$, and $+40\%$. Note in steps 104–110 that the value of j is used as a pointer to step through the individual elements (sums) of the teach sub signature to obtain the sub pixel sub signatures.

The sub pixel sub signature computed at step 104 is stored as $SPSS_{1,j}$ (corresponding to the $-20\%$ sub pixel position). The sub pixel sub signature computed at step 106 is stored as $SPSS_{2,j}$ (corresponding to the $-40\%$ sub pixel position). The sub pixel sub signature generated at step 108 is stored as $SPSS_{3,j}$ (corresponding to the $+20\%$ pixel position). And, the sub pixel sub signature generated at step 110 is stored as $SPSS_{4,j}$ (corresponding to the $+40\%$ sub pixel position).

After the four sub pixel sub signatures have been generated from the reference (or teach) sub signature, step 112 may be performed to obtain data for rotated axes and other coordinates, if desired, as more fully explained in the '205 patent. Thereafter, a test may be executed, as illustrated at step 114, by entering the run mode (described below) and comparing the data obtained in the run mode for the reference object to that obtained in the teach mode. After test 114 is completed, the object (die 10) may be physically moved with respect to the camera 26 to focus the camera 26 on a second reference or "eyepoint" and the entire teach process repeated, as indicated at step 116, to generate a second set of sub signatures, that is, one each in X and Y coordinates for a second reference point.

Run Mode

Figure 7A:
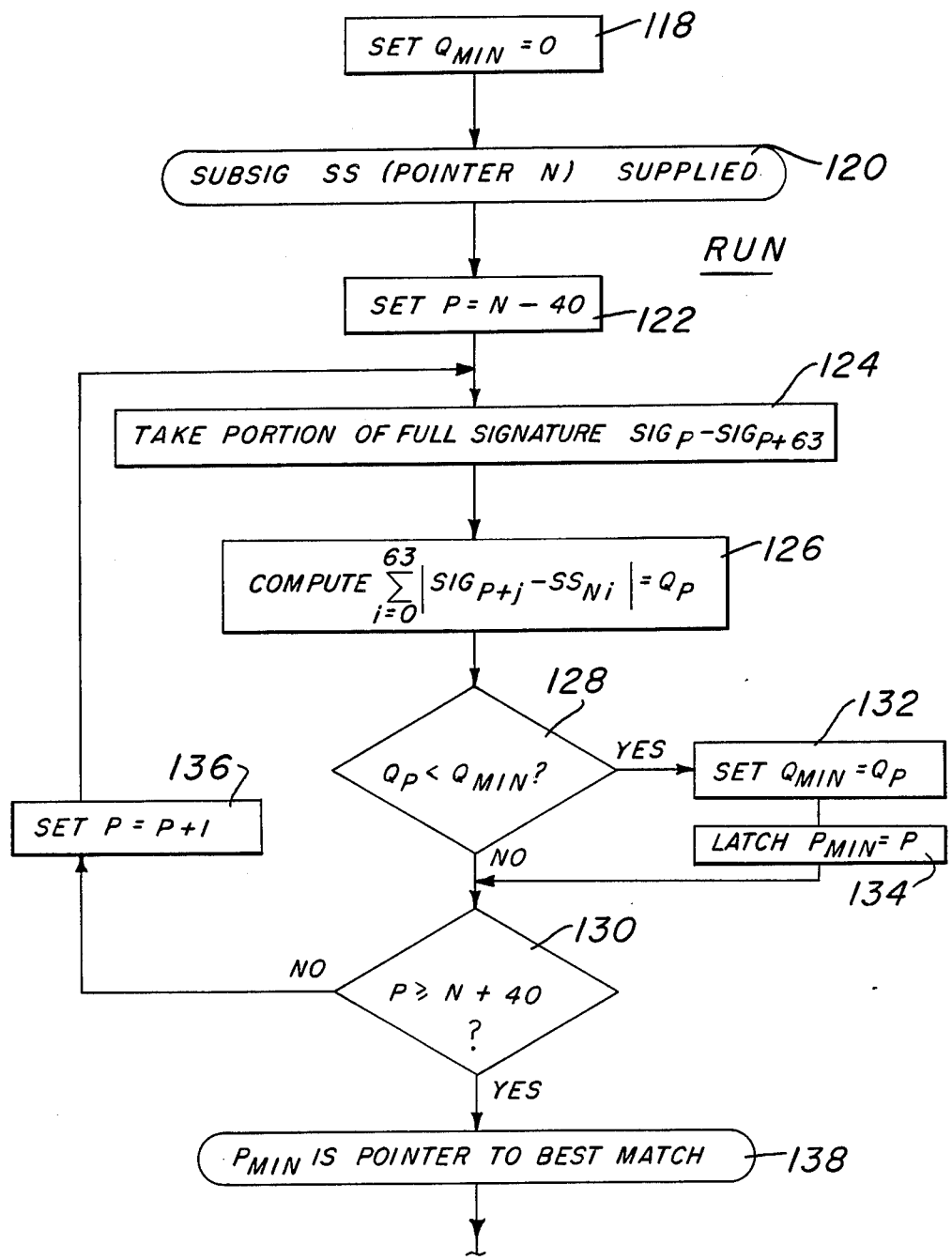
FIGS. 7A, 7B and 7C are flow charts illustrating the preferred practice of the method of the present invention in the run mode.
Figure 7B:
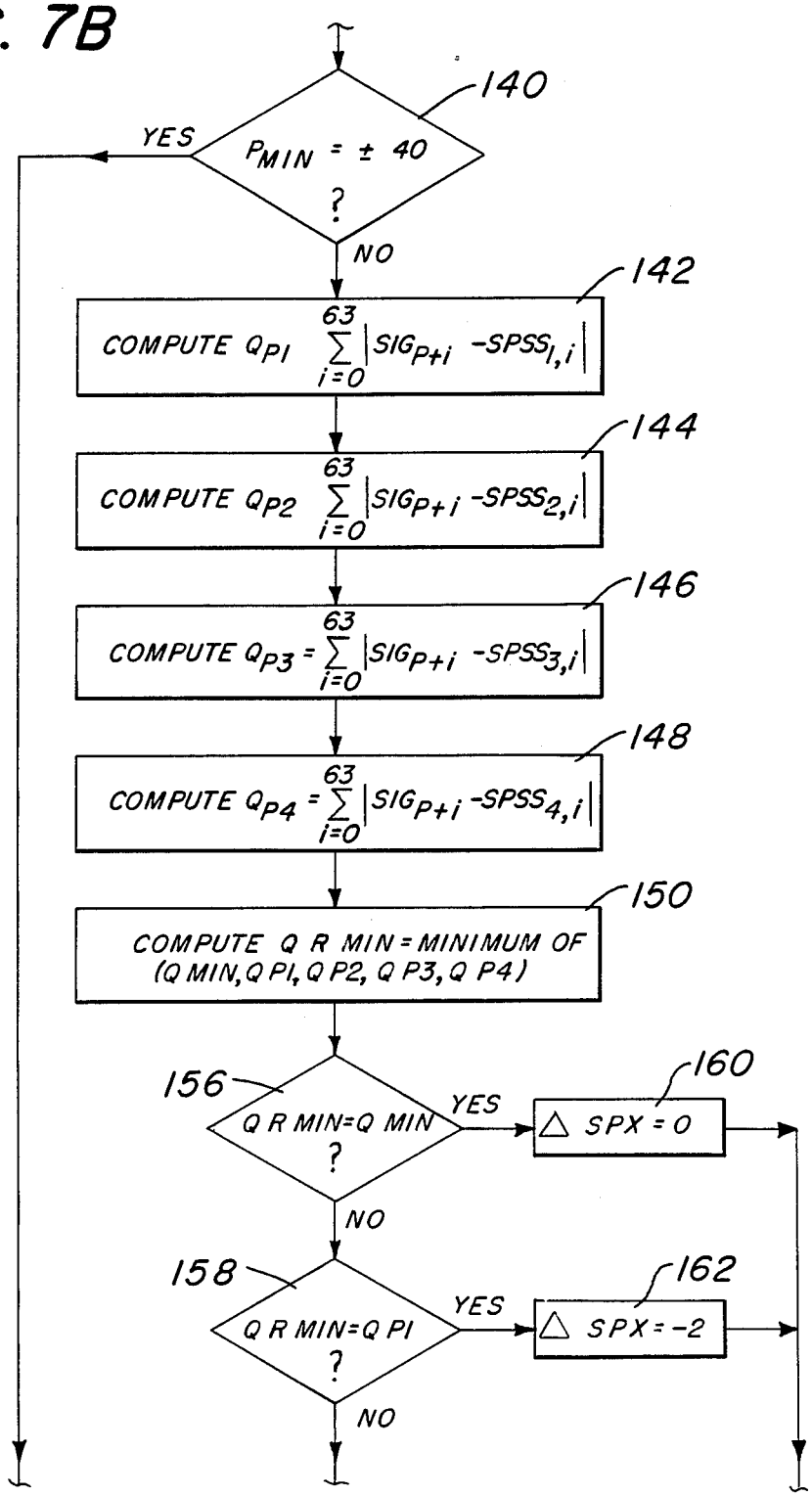
Figure 7C:
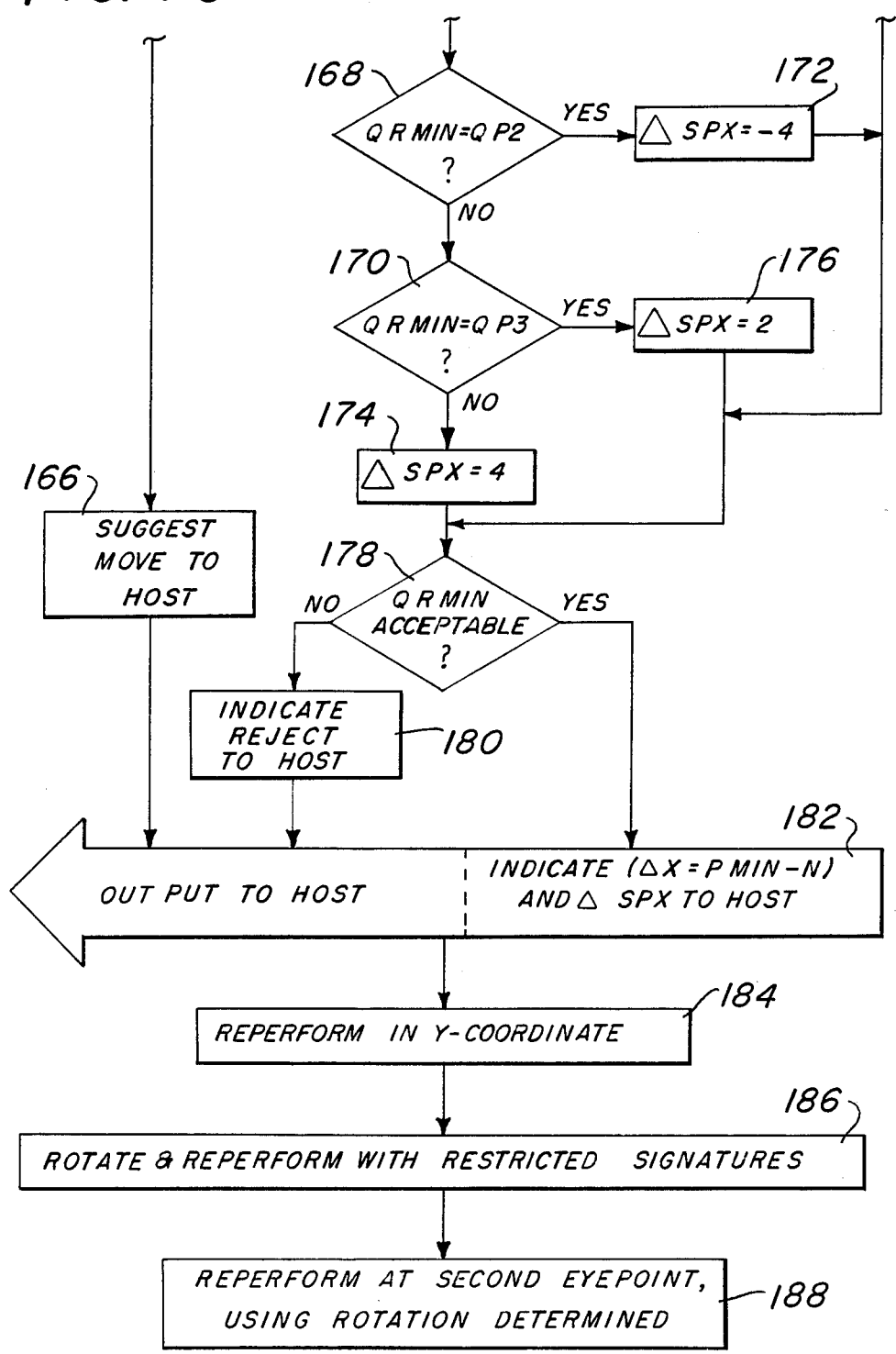

As more fully explained in the '205 patent, the vision system is operated in a "run mode" after operation in the teach mode. In the run mode, a target object is viewed by the camera 26 for the purpose of obtaining a target signature and target sub signature and locating the position of the target object relative to that of the reference object. This run mode of operation, modified according to the present invention, is illustrated in FIGS. 7A-7C. In the run mode of operation, the target object is placed under the camera and the appropriate eyepoint is located by the operator. Thereafter, microprocessor 30 performs the steps illustrated in blocks 118 through 188 for moving the work table, if necessary, to bring the appropriate portion of die 10 within the reach of the work station for a wire bonding operation.

In the wire bonding art, the maximum displacement of the die 10 from its nominal position is a statistical function of manufacturing tolerances and the like. It has been found in practice that an acceptably high number of die fall within a plus/minus 40 integer pixel range from their nominal location. Accordingly, the sub signature generated above in the teach mode need only be compared with portions of the target signature displaced plus/minus 40 integer pixels from this reference area. This statistical finding is useful as it minimizes processing time. Further, in this way, any repetitive image having a frequency of less than 40 integer pixels does not cause erroneous identification.

Turning now to FIG. 7A, the run mode of operation will be explained. When the run mode is first entered, the value of $Q_{MIN}$ is set to 0, as illustrated at step 118. Thereafter, at step 120, a sub signature $SS_N$ for the image of the target object is obtained by retrieving the previously computed value of the pointer N. Thereafter, at step 122, a pointer P is assigned the value $N-40$. The pointer P indicates that portion of the target signature to which the sub signature $SS_N$ is to be compared. At step 124, a snap shot of the current target sub signature under consideration is supplied, the individual elements of which are designated $SIG_P$ through $SIG_{P+63}$.

At step 126, the absolute value of the differences between elements $SIG_{P+i}$ (where i is the pointer that steps through the individual elements of the signature) and sub signature elements $SS_{Ni}$ is calculated through $i=0$ to $i=63$. The result of this summation is designated $Q_P$. The value of $Q_P$ is proportional to the degree of correspondence between the sub signature $SS_N$ and the Pth portion of the total target signature. At step 128, a test is made to determine if this is the smallest $Q_P$ thus far detected (i.e., to determine if $Q_P$ is smaller than the stored value of $Q_{MIN}$). If the value of $Q_P$ is less than the stored value of $Q_{MIN}$, then the value of $Q_{MIN}$ is that of $Q_P$ as indicated at 132 and the value of the pointer P is stored as $P_{MIN}$, as indicated at step 134. The value of $P_{MIN}$ indicates the best fit thus far found.

At step 130, the value of P is tested against the value of $N+40$. If the value of P is less than the value of $N+40$, then the value of P is incremented by 1 as indicated at step 136 and steps 124-130 are repeated, as required. Eventually, the value of $P_{MIN}$ will point to the location of the best match, as noted at step 138, and accordingly, the value of $P_{MIN}-N$ is indicative of the position (in integer pixels) of the target object relative to that of the reference object viewed during the teach mode.

At step 140, a test is made to determine whether the position of the target die is shifted exactly plus or minus 40 integer pixels relative to the reference object. If the value of $P_{MIN}=+/-40$ (i.e., if the best match is at $+/-40$ integer pixels), then the target scene is rejected and a work table move is suggested to the host, as shown at 166. The reason for this is as follows.

Any series of the 81 mis-match values comprising the "error function" has a minimum value, which is called the Q value. If graphically represented, each of the 81 values is seen to be related to its neighbor in such a way as to present a generally monotonous decrease of mismatch toward the minimum, and a similar increase of mismatch moving away from the minimum. If we picture the minimum point moving in a given direction in successive series of 81 values, we can reasonably conclude that the target eye point is being "tracked". We are willing to accept the Q value's lateral position as an indicator of the eye point's lateral position, but only when that position is less than $\pm 40$ because when it is at $\pm 40$, we have no assurance that the monotonous change described above would not have continued to an even lower value beyond the 40 tested, in which case we would be in error declaring that the eye point was located at 40 ($\pm$).

If, at step 140, it was determined that the value of $P_{MIN}$ was not exactly plus or minus 40 integer pixels, steps 142-148 are performed. At steps 142-148, each element (sum) of the target sub signature selected at step 124 is compared to each element (sum) of each of the sub pixel sub signatures generated in the teach mode. Thus, at step 142, the individual elements of the target sub signature and of the $-20\%$ sub pixel sub signature are subtracted and their absolute values are summed together. The result is assigned a label $Q_{P1}$. Similarly, at step 144, the individual elements of the target sub signature and of the $-40\%$ sub pixel sub signature are subtracted and their absolute values are summed. The result of this summation is assigned a label $Q_{P2}$. Again, at step 146, the individual elements of the target sub signature and the $+20\%$ sub pixel sub signature are subtracted and their absolute values are summed. The result of this summation is assigned a label $Q_{P3}$. Finally, at step 148, the individual elements of the target sub signature are subtracted from the individual elements of the $+40\%$ sub pixel sub signature and their absolute values are summed. The result of this summation is assigned a label $Q_{P4}$.

At step 150, the one of $Q_{MIN}$, $Q_{P1}$, $Q_{P2}$, $Q_{P3}$, $Q_{P4}$ having the lowest value is determined and assigned a label $Q_{RMIN}$. Successive comparisons are performed at steps 156-170 to determine which sub pixel sub signature most closely matches the target sub signature to provide an indication of the relative fractional (sub pixel) position of the target object relative to the reference object. Thus, at step 156, the value of $Q_{RMIN}$ is compared to the value of $Q_{MIN}$. If they are found to be equal, then this is an indication that the image of the target object lies on integer pixel boundaries and is not shifted relative to the image of the reference object by any fractional pixel amount. This is indicated at step 160. If the value of $Q_{RMIN}$ is not equal to the value of $Q_{MIN}$, then a test is made at step 158 to see if the value of $Q_{RMIN}$ is equal to the value of $Q_{P1}$. If it is, then this is an indication that the image of the target object is shifted by a fractional (sub pixel) amount of $-20\%$ (to the left of the integer pixel boundary) relative to the image of the reference object. This is indicated at step 162. Similar tests are made for the $-40\%$ and $+20\%$ fractional (sub pixel) positions at steps 168 and 170, respectively. The amount of fractional (sub pixel) shift for these positions is indicated at steps 172, 176, respectively. If no match is found at steps 156, 158, 168 or 170, then it is assumed, at step 174, that the image of the target object is shifted to the +40% fractional (sub pixel) position (to the right) relative to the image of the reference object. After a determination is made at any one of steps 160, 162, 172, 174 or 176, step 178 is performed. At step 178, the value of $Q_{RMIN}$ is tested against a pre-selected reference value to determine whether it is acceptable. If the value of $Q_{RMIN}$ is determined not to be acceptable, then an appropriate indication, such as a reject signal, is provided to the host 22 as shown at 180, whereby further processing may be performed. On the other hand, if the value of $Q_{RMIN}$ is found to be acceptable, both the integer pixel position ($P_{MIN}-N$) and the fractional (sub pixel) position (SPX) are provided to the host 22, as indicated at step 182. It should be understood that the position information provided to the host 22 at step 182 is relative position information, i.e., this data indicates the position of the target object relative to the reference object viewed during the teach mode. The host 22 is preferably responsive to the position information provided at step 182 to move the work table relative to the work station so that a bonding operation may be performed.

As indicated at step 184, steps 118-182 of the run operation may be re-performed for another coordinate, e.g., the Y coordinate of the image. If desired, the image may be rotated by microprocessor 30 and steps 118-182 may be re-performed with restricted signatures, as more fully explained in the '205 patent.

Also, if desired, steps 118-182 may be re-performed utilizing a second eyepoint, as illustrated at step 188, and as more fully explained in the '205 patent.

As has been mentioned, in a preferred embodiment of the present invention, the pixels are 0.00025" square, e.g., there are four pixels per mil. In accordance with the practice of the present invention, therefore, where 4 sub pixel sub signatures are provided, the relative position of the target object may be determined to within 1/5 of a pixel.

Figure 2:
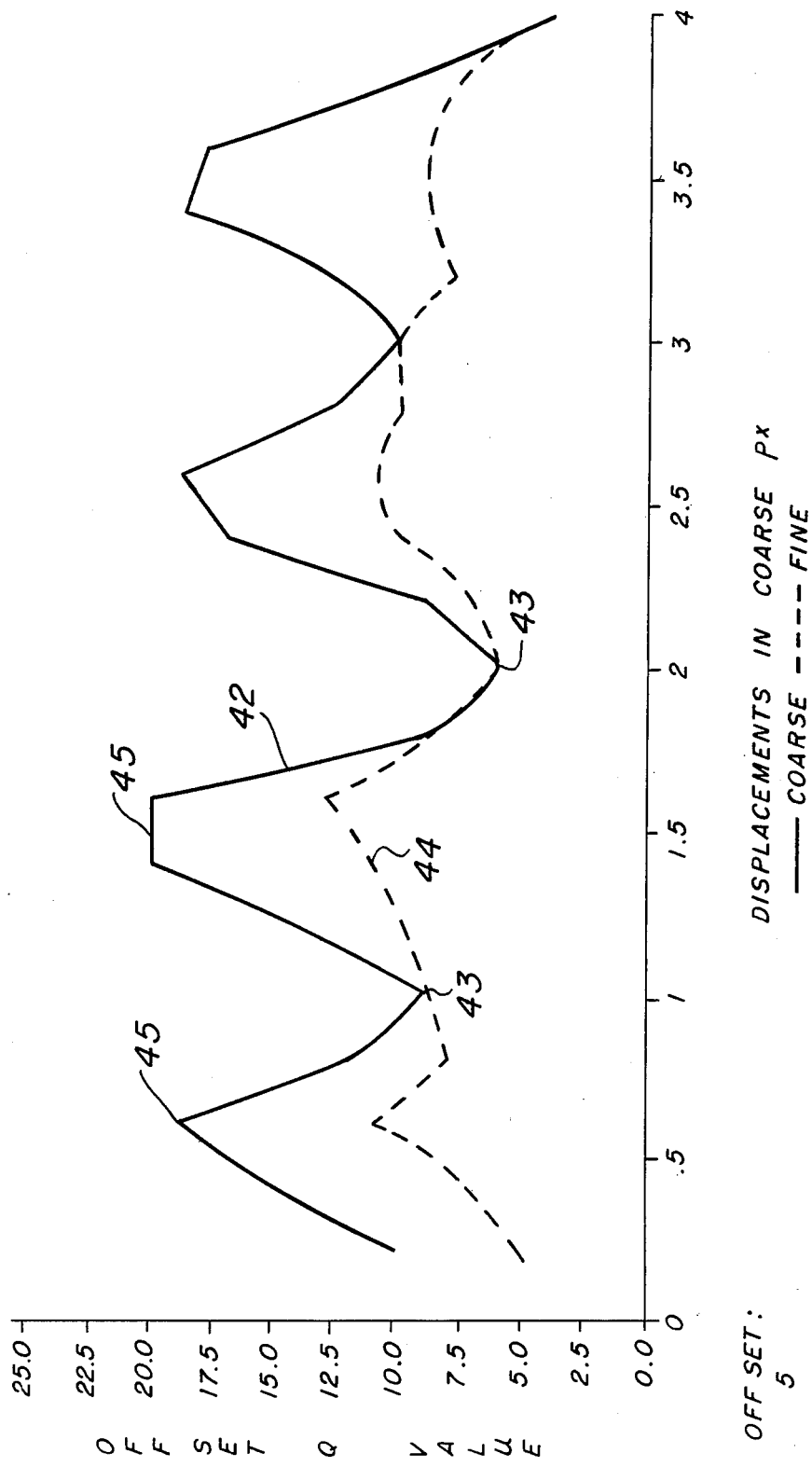
FIG. 2 is a graph illustrating the degree of match between a reference signature and a target signature in the case of both the '205 (graph 42) and the present invention (graph 44).

FIG. 2 graphically illustrates one example of an attainable degree of match between the image of a target object and the image of a reference object according to the teachings of the '205 patent (graph 42) and according to the teachings of the present invention (graph 44). As can be seen, graph 42 rises and drops sharply as an object is shifted through integer pixels, thus indicating a poor degree of match except at precise integer pixel positions 43. Graph 44, on the other hand, demonstrates that there is a much improved degree of match even when the object is displaced by a fraction of a pixel. Since the degree of match is a key parameter in the operation of vision systems of the instant type, the present invention offers increased performance advantages over prior art types such as that disclosed in the '205 patent. Moreover, and more importantly, according to the present invention, the relative position of a target object can be determined with much greater accuracy than was heretofore possible.

The present invention may be embodied in other specific forms without departing from the spirit or essential attributes thereof and, accordingly, reference should be made to the appended claims, rather than to the foregoing specification, as indicating the scope of the invention.

I claim:

1. Method of operating a vision system of the type employing a camera means for providing an image of at least a portion of an object viewed by the camera means, the image comprising a plurality of adjacent pixels, comprising the steps of:
    (a) viewing at least a portion of the object with the camera means and generating a target signature form the image;
    (b) comparing at least a portion of the target signature to a plurality of sub pixel signatures, each sub pixel signature corresponding to a unique sub pixel position between pixel positions;
    (c) determining which sub pixel signature most closely matches the target signature based upon the result of the comparison; and
    (d) providing an indication of position of the object based upon the sub pixel signature determined to most closely match the target signature.

2. Method of according to claim 1 wherein the pixels are arranged in a matrix, each pixel being represented by an output signal having a magnitude indicative of a surface condition of a corresponding portion of the object, the target signature and sub pixel signatures each comprising a series of sums, each sum in the target signature being obtained by totaling magnitudes corresponding to columns of pixels.

3. Method according to claim 2 wherein the sub pixel signatures are generated by linearly ramping at least a portion of a reference signature obtained from viewing a reference object with the camera means.

4. Method according to claim 2 wherein the sub pixel signatures are generated by application of a formula of the following type to the sums comprising the reference signature:

$$[V_{(N+1)} - V_N] \times F + V_N$$

where:
N = the number of the column in the matrix;
V = the value of the sum in the reference signature corresponding to the column number specified; and,
F = the result of 1 minus the decimal value of the sub pixel position for which it is desired to generate a sub pixel signature.

5. Method according to claim 1 wherein the sub pixel signatures are generated in response to viewing a reference object with a camera means.

6. Method according to claim 1 wherein the sub pixel signatures are generated when the vision system is in a teach mode of operation.

7. Method according to claim 1 wherein the target signature is generated in response to viewing a target object with the camera means.

8. Method according to claim 1 wherein the target signature is generated when the vision system is in a run mode of operation.

9. Method according to claim 1 wherein the target signature that is compared to the sub pixel signatures is a target sub signature, the target sub signature being a selected portion of a larger target signature that is obtained when a target object is viewed by the camera means.

10. Method according to claim 9 wherein the sub pixel signatures that are compared with the sub target signature are sub pixel sub signatures, each sub pixel sub signature being obtained by linearly ramping a selected portion of a reference signature obtained when a reference object is viewed by the camera means.

11. Method according to claim 1 wherein the position of the object that is provided is relative to the position of a reference object that has been viewed by the camera means.

12. Method according to claim 11 wherein a reference signature is generated from the reference object and the sub pixel signatures are generated from the reference signature.

13. Method according to claim 12 wherein the relative position of a target object is provided.

14. Method according to claim 1 wherein four sub pixel signatures are generated and correspond to +20%, +40%, −20%, and −40% displacement relative to integer pixel boundaries.

15. Method according to claim 1 wherein position of the object is determined to within 1/5 of a pixel distance.

16. Method according to claim 1 further comprising the step of altering the position of a work table based upon the provided indication of position of the object.

17. Method of operating a vision system of the type employing a camera for providing an image comprising a plurality of adjacent pixels arranged in a matrix, each pixel being represented by an output signal having a magnitude indicative of a surface condition of a corresponding portion of an object viewed by the camera, and means receiving the output signals for providing a digital image of at least a portion of the object comprising the steps of:
  (a) viewing at least a portion of a target object with the camera and generating a target signature from the image, the signature comprising a series of sums, each sum in the series being obtained by totaling digital image data corresponding to columns of pixels;
  (b) selecting a particular portion of the target signature, and defining the selected portion as a target sub signature;
  (c) comparing the target sub signature to a plurality of sub pixel sub signatures, each sub pixel sub signature corresponding to a unique sub pixel position and being obtained mathematically from a reference sub signature, the reference sub signature being obtained from a selected portion of a reference signature generated in response to viewing a reference object with a camera, the sub pixel sub signatures being obtained by linearly ramping the reference sub signature;
  (d) determining with sub pixel sub signature most closely matches the target sub signature;
  (e) providing an indication of the position of the target object relative to the reference object based upon the sub pixel sub signature determined to most closely match the target sub signature.

18. Method according to claim 17 wherein the sub pixel sub signatures are generated by application of a formula of the following type to the sums comprising the reference sub signature:

$$[V_{(N+1)} 31 V_N] \times F + V_N$$

where:
  N = the number of the column in the matrix;
  V = the value of the sum in the reference sub signature corresponding to the column number specified; and,
  F = the result of 1 minus the decimal value of the sub pixel position for which it is desired to generate a sub pixel signature.

19. Method according to claim 17 wherein the vision system alters the position of a work table based upon the provided indication of position of the target object.

20. Method according to claim 17 wherein the reference signature is generated when the vision system is in a teach mode of operation.

21. Method according to claim 20 wherein the signature for the target object is generated when the vision system is in a run mode of operation.

22. Method according to claim 17 wherein four sub pixel sub signatures are generated and correspond to +20%, +40%, 20% and −40% displacement relative to integer pixel boundaries.

23. Method according to claim 17 wherein the position of the target object relative to the reference object is determined to within 1/5 of a pixel distance.

24. Method of operating a vision system of the type employing a camera for providing an image comprising a plurality of adjacent pixels arranged in a matrix, each pixel being represented by an output signal having a magnitude indicative of a surface condition of a corresponding portion of an object viewed by the camera, and means for digitizing the output signals and providing a digital image of at least a portion of the object, comprising the steps of:
  (a) operating the vision system in a teach mode wherein the following steps are performed:
    (i) viewing a reference object with the camera;
    (ii) generating a reference signature from the digital image of the reference object, the reference signature comprising a series of sums, each sum being obtained by totaling digital image data corresponding to columns of pixels;
    (iii) selecting a portion of the reference signature that corresponds to a unique portion of the image of the reference object and defining the selected portion as a reference sub signature; and
    (iv) generating a plurality of sub pixel sub signatures from the reference sub signature, each sub pixel sub signature corresponding to a unique sub pixel position and being obtained by linearly ramping the reference sub signature; and,
  (b) operating the vision system in a run mode wherein the following steps are performed:
    (i) viewing a target object with the camera;
    (ii) generating a plurality of target sub signatures from the digital image of the target object, the target image comprising a series of sums, each sum being obtained by totaling digital image data corresponding to columns of pixels;
    (iii) comparing the target sub signatures with the reference sub signature in a selected range of integer pixel positions to locate the particular integer pixel position providing the best match, the result defining a target sub signature and indicating the amount of displacement, in integer pixels, of the target object relative to the reference object.
    (iv) comparing the target sub signature to the sub pixel sub signatures to determine the sub pixel sub signatures that most closely matches the target sub signature, the result indicating the amount of displacement, in a fraction of a pixel, of the target object relative to the reference object; and
    (v) providing an indication of position of the target object relative to the reference object based upon the result of the determination of steps (iii) and (iv).

25. Method according to claim 24 further comprising the step of moving a work table according to the result of step (b) (v).

26. Method according to claim 24 wherein four sub pixel sub signatures are generated and correspond to +20%, +40%, −20% and −40% displacement relative to integer pixel boundaries.

27. Method according to claim 24 wherein the position of the target object relative to the reference object is determined to within 1/5 of a pixel.

28. Method according to claim 24 wherein the sub pixel signatures are generated by application of a formula of the following type to the sums comprising the reference sub signature:

$$[V_{(N+1)} - V_N] \times F + V_N$$

where:
N = the number of the column in the matrix; V = the value of the sum in the reference sub signature corresponding to the column number specified; and, F = the result of 1 minus the decimal value of the sub pixel position for which it is desired to generate a sub pixel signature.

29. Vision system apparatus comprising:
(a) means for viewing at least a portion of an object with a camera means for providing an image of the object, the image comprising a plurality of adjacent pixels;
(b) means for generating a target signature from the image of the object;
(c) means for comparing at least a portion of the target signature to a plurality of sub pixel signatures, each sub pixel signature corresponding to a unique sub pixel position;
(d) means for determining which sub pixel signature most closely matches the target signature based upon the result of the comparison; and
(e) means for providing an indication of position of the target object based upon the sub pixel signature determined to most closely match the signature.

30. Apparatus according to claim 29 wherein the pixels are arranged in a matrix, each pixel being represented by an output signal having a magnitude indicative of a surface condition of a corresponding portion of the object, and wherein the means for generating a signature comprises means for generating a series of sums by totaling magnitudes corresponding to columns of pixels.

31. Apparatus according to claim 29 further comprising means for generating the sub pixel signatures from an image generated in response to viewing a reference object with the camera means.

32. Apparatus according to claim 31 wherein the means for generating the target signature is responsive to viewing a target object with the camera means.

33. Apparatus according to claim 31 wherein the means for generating the sub pixel signatures comprises means for linearly ramping at least a portion of a reference signature obtained from viewing the reference object.

34. Apparatus according to claim 29 further comprising means, responsive to the means for providing an indication of position, for altering the position of a work table on which the object is placed.

35. Vision system apparatus comprising:
(a) camera means for providing an image comprising a plurality of adjacent pixels arranged in a matrix, each pixel being represented by an output signal having a magnitude indicative of a surface condition of a corresponding portion of an object viewed by the camera means; and
(b) processing means operatively coupled to the camera means and receiving the output signals from the pixels, the processing means being operable in a teach mode, when a reference object has been viewed by the camera means, to:
(i) sum the magnitudes corresponding to columns of pixels in a predetermined manner to provide a series of sums defining a teach signature;
(ii) select a portion of the teach signature that is most unlike any other portion of the teach signature, the selected portion defining a teach sub signature;
(iii) linearly ramp the teach sub signature to provide a plurality of sub pixel sub signatures, each sub pixel sub signature corresponding to a sub pixel position;

the processing means further being operable in a run mode, when a target object has been viewed by the camera means to:
(iv) sum the magnitudes corresponding to columns of pixels in a predetermined manner to provide a series of sums defining a target signature;
(v) compare the target signature with the teach signature in a selected range of integer pixel positions to locate the particular integer pixel position providing the best match, the result defining a target sub signature and indicating the amount of displacement, in integer pixels, of the target object relative to the reference object;
(vi) compare the target sub signature to the sub pixel sub signatures to determine the sub pixel sub signature that most closely matches the target sub signature, the result indicating the amount of displacement, in fraction of a pixel, of the target object relative to the reference object; and
(vii) provide an indication of the result of the determination of steps (v) and (vi).

36. Apparatus according to 35 wherein the processing means is further operable in the run mode to move a work table according to the result of the determination.

* * * * *

UNITED STATES PATENT AND TRADEMARK OFFICE
CERTIFICATE OF CORRECTION

PATENT NO. : 4,853,968

DATED : August 1, 1989

INVENTOR(S) : Berkin

It is certified that error appears in the above-identified patent and that said Letters Patent is hereby corrected as shown below:

Column 14, line 6, the word "form" should be --from--.

Column 14, line 62, at the end of the line, instead of the words "sub target" it should read --target sub--.

Column 15, line 48, the word "with" should be --which--.

Column 15, line 59, the numbers "31" should be replaced by a minus sign -- - --.

Column 17, line 41, delete the word "target", after "the".

Column 17, line 42, after the word "the" insert the word --target--.

Signed and Sealed this

Twenty-third Day of June, 1992

Attest:

DOUGLAS B. COMER

*Attesting Officer*     *Acting Commissioner of Patents and Trademarks*